United States Patent
Tiwari et al.

(10) Patent No.: US 11,409,588 B1
(45) Date of Patent: Aug. 9, 2022

(54) PREDICTING HARDWARE FAILURES

(71) Applicant: KYNDRYL, INC., New York, NY (US)

(72) Inventors: Awadesh Tiwari, Bangalore (IN); Yosha Singh Tomar, Mumbai (IN); Amol Bhaskar Mahamuni, Bangalore (IN)

(73) Assignee: KYNDRYL, INC., New York, NY (US)

( * ) Notice: Subject to any disclaimer, the term of this patent is extended or adjusted under 35 U.S.C. 154(b) by 42 days.

(21) Appl. No.: 17/195,772

(22) Filed: Mar. 9, 2021

(51) Int. Cl.
*G06F 11/00* (2006.01)
*G06N 20/00* (2019.01)

(52) U.S. Cl.
CPC ........... *G06F 11/004* (2013.01); *G06N 20/00* (2019.01)

(58) Field of Classification Search
CPC .............................. G06F 11/004; G06N 20/00
See application file for complete search history.

(56) References Cited

U.S. PATENT DOCUMENTS

| | | | |
|---|---|---|---|
| 7,730,364 B2 * | 6/2010 | Chang | H04L 41/0663 714/47.2 |
| 2011/0029824 A1 | 2/2011 | Scholer | |
| 2014/0188405 A1 | 7/2014 | Ba | |
| 2015/0067410 A1 | 3/2015 | Kumar | |
| 2016/0146709 A1 | 5/2016 | Dey | |
| 2019/0004891 A1 | 1/2019 | Bi | |
| 2021/0287109 A1 * | 9/2021 | Cmielowski | G06N 20/00 |
| 2021/0365821 A1 * | 11/2021 | Vishwakarma | G05B 23/024 |

OTHER PUBLICATIONS

Anonymous et al., "Method of Component Failure Prediction in Large Server and Storage Systems", An IP.com Prior Art Database Technical Disclosure, IP.com No. IPCOM000191729D, IP.com Electronic Publication Date: Jan. 13, 2010, 6 Pages.
Chigurupati et al., "Predicting Hardware Failure Using Machine Learning", Published in: 2016 Annual Reliability and Maintainability Symposium (RAMS), Jan. 28, 2016, 6 Pages.
Lee et al., "Adaptive Stress Testing: Finding Likely Failure Events with Reinforcement Learning", Journal of Artificial Intelligence Research 69 (2020),1165-12, Dec. 4, 2020, 37 Pages.
Prophetstor, "Hardware Failure Predictions and Resource Monitoring", ProphetStor Data Services, Inc., Accessed on Dec. 9, 2020, 8 Pages.
Sun et al., "System-level hardware failure prediction using deep learning", Published in: 2019 56th ACM/IEEE Design Automation Conference (DAC), Jun. 6, 2019, 6 Pages.

* cited by examiner

*Primary Examiner* — Nadeem Iqbal
(74) *Attorney, Agent, or Firm* — Kenneth Han, Esq.; Blanche E. Schiller, Esq.; Heslin Rothenberg Farley & Mesiti P.C.

(57) ABSTRACT

In an approach for generating hardware failure labels, a processor receives sensor data from a plurality of sensors associated with a hardware system. A processor calculates an adaptive stress factor, wherein the adaptive stress factor is a dynamic selection model. A processor calculates an adaptive stress time window, wherein the adaptive stress time window is a spatial distribution of the adaptive stress factor. A processor calculates a relative duty cycle, wherein the relative duty cycle is a first function of an internal state of the hardware system, a type of input to the hardware system, the adaptive stress factor, and the adaptive stress time window. A processor generates a failure label, wherein the failure label is calculated as a second function of the relative duty cycle and a design duty cycle.

20 Claims, 3 Drawing Sheets

PREDICTING HARDWARE FAILURES

BACKGROUND OF THE INVENTION

The present invention relates generally to the field of machine learning, and more particularly to generating failure labels in hardware time series data to enable use of artificial intelligence and machine learning for predicting hardware performance and failures.

The computing world has seen advancements in processing capabilities and an increase in data collection and storage. With such enhanced technologies, businesses are turning to Artificial Intelligence (AI) and machine-learning (ML) for finding solutions to everyday business problems, such as hardware system performance. One challenge with ML is the need for structured, cleaned, and labelled datasets to be able to accurately train a supervised ML algorithm. For an ML solution to predict when a hardware system is going to fail, the ML model needs to learn the difference in trends of normal operating parameters and those of failure conditions.

Most solutions for predicting when a hardware system is going to fail today make use of labelled data to identify failure instances in a given dataset. This labelled data includes storage of historical failure pattern of metrices, system logs containing hardware failure information, or labelled windows of time where failure of a hardware device was observed. Some solutions use factors such as age of hardware components or past critical events (such as hot reboots, component usage, and repair information) to calculate failure time. In the absence of such a labelled dataset and/or factor data, these ML solutions stand obsolete. Furthermore, such solutions fall short as the factor data may not always be the primary reason for a hardware failure. Some solutions incorporate laboratory tests performed on devices to assess their performance under stressful conditions, but these simulated tests may not be feasible or may not always replicate all the various scenarios of real-time operation of devices. Additionally, these ML solutions rely on models that mimic hardware systems bound to fail.

SUMMARY

Aspects of an embodiment of the present invention disclose a method, computer program product, and computer system for generating failure labels in hardware time series data to enable use of artificial intelligence and machine learning for predicting hardware performance and failures. A processor receives sensor data from a plurality of sensors associated with a hardware system. A processor calculates an adaptive stress factor, wherein the adaptive stress factor is a dynamic selection model. A processor calculates an adaptive stress time window, wherein the adaptive stress time window is a spatial distribution of the adaptive stress factor. A processor calculates a relative duty cycle, wherein the relative duty cycle is a first function of an internal state of the hardware system, a type of input to the hardware system, the adaptive stress factor, and the adaptive stress time window. A processor generates a failure label, wherein the failure label is calculated as a second function of the relative duty cycle and a design duty cycle.

DETAILED DESCRIPTION

Figure 1:
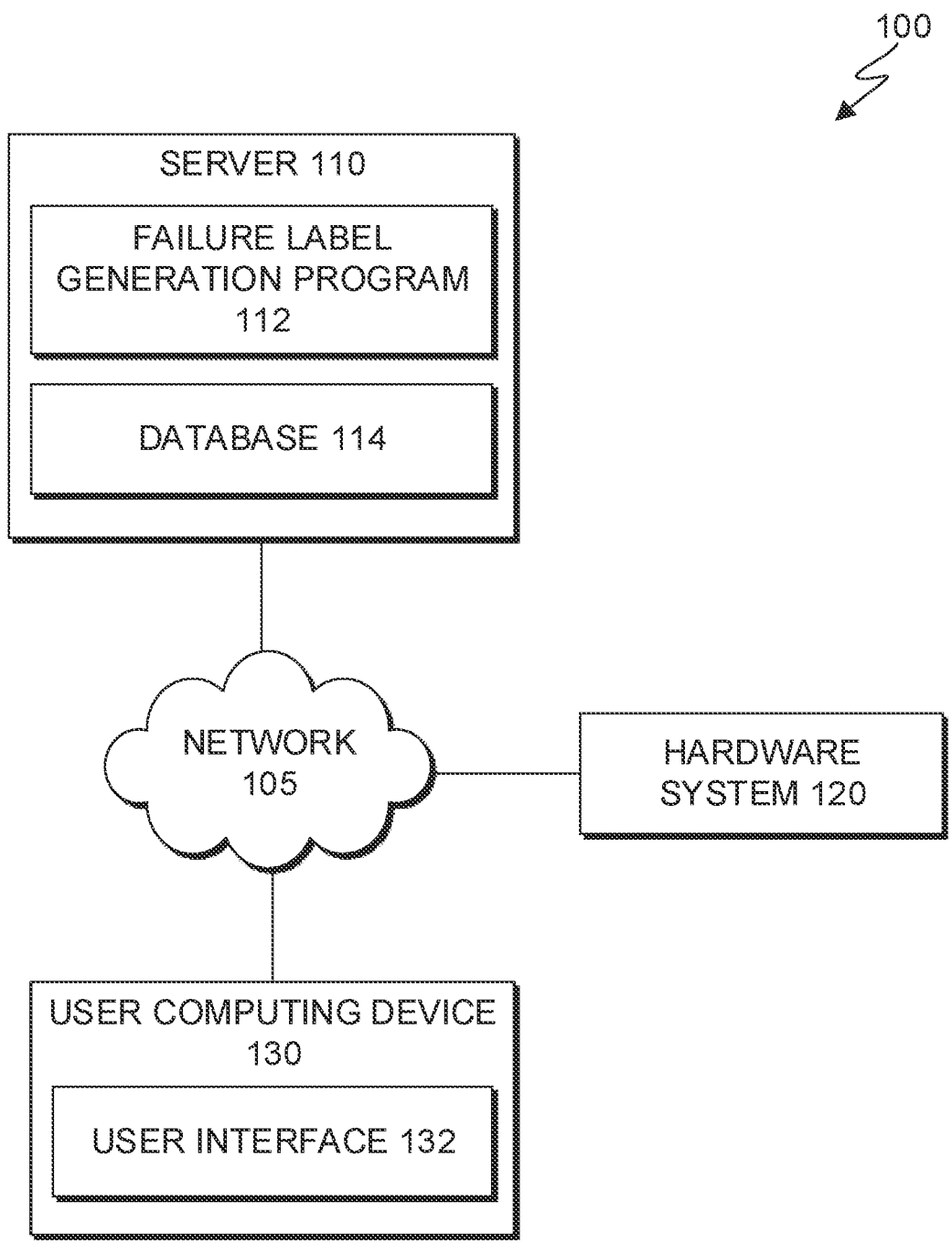
FIG. 1 is a functional block diagram illustrating a distributed data processing environment, in accordance with an embodiment of the present invention.

Embodiments of the present invention recognize that current hardware failure prediction methods are based on input failure data, failure logs, and/or hardware-in-loop simulations or software-in-loop simulations. The problem is all of these methods rely on models that mimic systems bound to fail. Embodiments of the present invention recognize the need for a solution for predicting when a hardware system will fail without any input failure data, failure logs, etc. that would act as the labelled data for a machine-learning (ML) system.

Embodiments of the present invention provide a program for generating failure labels in hardware time series data for a given hardware system to be used by Artificial Intelligence (AI) and ML models to predict the hardware system's performance and/or failures. Embodiments of the present invention utilize AI technology, such as a neural network or an adaptive classification ML model, to compute an adaptive stress factor component and adaptive stress time window component, which are used to generate a failure label. These components utilize AI in their self-learning and self-adaptive models to learn the hardware system's behavior over time including the type and amount of stress bore by the hardware system under given operating scenarios, and, thus, the adaptive stress factor is generated and calibrated every operating time and the adaptive stress time window is adaptively adjusted.

Embodiments of the present invention define hardware system states under stress and formulate corresponding labels to identify failure of a given part of the hardware system. Some embodiments of the present invention further generate a bias penalty factor that is fed back into the system as a reinforcement learning loop to gradually retrain the program and improve the output (e.g., failure labels).

The hardware system under consideration is characterized by a system matrix A(t) in terms of the hardware system's eigenvalues and eigenvectors, in which the system matrix represents the hardware system's internal stability and internal behavioral states and t represents a current time. Continuous time series data is collected from the hardware system using hardware and/or Internet of Things (IoT) sensors and collected in the form of Windows Performance Monitor (Perfmon) metrices, in which Perfmon metrices refer to health parameters for the hardware system that are programmatically collected. Types of inputs provided to the hardware system over time can be defined as B(t). Types of inputs may include, but are not limited to, temperature over time, pressure, vibrations, number of user inputs/instructions, usage types (hard, soft), failure frequencies, replacement frequency, maintenance schedules, number of users, and applications types.

The behavior of the hardware system under a given type of input B(t) is measured by an adaptive stress factor ASF(τ), which is a dynamic selection model, neural network, or an adaptive classification ML model that selects a first order or second order differential equation based on whether the first order differential equation dx/dy shows a rate of change or the rate of change is seen in the second order differential equation $dx^2/dy^2$, i.e., first order or a second order change percentage of various parameters and/ or time series metrices of the hardware system, in which r represents a predicted change in time Δt. The change percentage represents the percentage of rise (increase) or fall (decrease) of various parameters for a part. For example, temperature changes with respect to vibrations, i.e., x=vibrations and y=temperature, and dx/dy doesn't show a rate of change, but $dx^2/dy^2$ shows a change in vibrations y due to temperature x.

An adaptive stress time window ASTW(τ) measures a sustenance of the adaptive stress factor over a given time, i.e., for a given system and given input, the adaptive stress time window ASTW(τ) measures how long a change is sustained during operation of the part, i.e., a spatial distribution of the adaptive stress factor ASF(τ).

The adaptive stress factor, adaptive stress time window, system matrix, and type of inputs are used to calculate a relative duty cycle RDC(t+τ) that represents a number of cycles that the part has gone through irrespective of design limits, i.e., the relative duty cycle is how the part tolerated and/or behaves throughout operation cycles, which could exceed design limits. For a given system, the relative duty cycle RDC(t+τ) is defined as a function of the internal state A(t) of the system, the type of input B(t), the change to a given type of input, and how long the change is sustained, as shown in equation (1) below.

$$RDC(t + \tau) = [A(t) * B(t) * ASF(\tau)]^{ASTW(\tau)} \quad (1)$$

Embodiments of the present invention produce a failure label FL(t+τ) as a function of the relative duty cycle RDC(t+τ) and a design duty cycle DDC, as shown in equation (2) below.

$$FL(t+\tau)=[w(t)*RDC(t+x)]\sim[g(t)*DDC] \quad (2)$$

In equation (2), the tilde ~ represents a mathematical function, such as addition, subtraction, or multiplication. The design duty cycle is a single value defined by a manufacturer that represents an expected number of cycles that the part is designed to work through without significant performance degradation. The relative duty cycle RDC(t+τ) and the design duty cycle DDC are normalized using adjustable weights w(t) and g(t), respectively, to ensure an output label of zero (0), denoting no failure, or an output label of one (1), denoting a failure. The failure label calculated is an absolute difference between a normalized design duty cycle and a normalized relative duty cycle, i.e., measures the quantitative difference in expected performance and the actual performance of the hardware system under stress over a period of time.

Implementation of embodiments of the invention may take a variety of forms, and exemplary implementation details are discussed subsequently with reference to the Figures.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110, hardware system 120, and user computing device 130, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, hardware system 120, user computing device 130, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with hardware system 120, user computing device 130, and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes failure label generation program 112 and database 114. Server 110 may include internal and external hardware components, as depicted and described in further detail with respect to FIG. 3.

Failure label generation program 112 operates to generate failure labels in hardware time series data for a given hardware system to be used by Artificial Intelligence (AI) and ML models to predict a hardware system's performance and/or failures. In the depicted embodiment, failure label generation program 112 is a standalone program. In another embodiment, failure label generation program 112 may be integrated into another software product, such as a system performance/health monitoring package. Failure label generation program 112 is depicted and described in further detail with respect to FIG. 2.

Database 114 operates as a repository for data received, used, and/or output by failure label generation program 112. Data received, used, and/or generated may include, but is not limited to, sensor data received by failure label generation program 112; and any other data received, used, and/or output by failure label generation program 112. Database 114 can be implemented with any type of storage device capable of storing data and configuration files that can be accessed and utilized by server 110, such as a hard disk drive, a database server, or a flash memory. In an embodiment, database 114 is accessed by failure label generation program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that failure label generation program 112 has access to database 114.

The present invention may contain various accessible data sources, such as database 114, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Failure label generation program 112 enables the authorized and secure processing of personal data.

Failure label generation program 112 provides informed consent, with notice of the collection of personal and/or confidential company data, allowing the user to opt in or opt out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Failure label generation program 112 provides information regarding personal and/or confidential company data and the nature (e.g., type, scope, purpose, duration, etc.) of the processing. Failure label generation program 112 provides the user with copies of stored personal and/or confidential company data. Failure label generation program 112 allows the correction or completion of incorrect or incomplete personal and/or confidential company data. Failure label generation program 112 allows for the immediate deletion of personal and/or confidential company data.

Hardware system 120 operates as the given hardware system for which failure labels will be generated by failure label generation program 112 based on hardware and/or IoT sensor data collected by hardware and/or IoT sensors (not shown) coupled to hardware system 120. Hardware system 120 represents a plurality of hardware parts/components of a computing system. Hardware system 120 can be any type of hardware system in either Information Technology (IT) areas—such as storage, compute, and platform systems—or non-IT areas—such as industrial, mechanical, electromechanical, and electronics systems. In an embodiment, hardware system 120 is characterized by system matrix A(t) in terms of the hardware system's eigenvalues and eigenvectors, in which t represents a current time. Continuous time series data is collected from hardware system 120 using the hardware and/or Internet of Things (IoT) sensors and collected in the form of Perfmon metrices, in which Perfmon metrices refer to health parameters for hardware system 120 that are programmatically collected. Hardware system 120 may include internal and external hardware components, as depicted and described in further detail with respect to FIG. 3.

User computing device 130 operates as a computing device associated with a user on which the user can interact with failure label generation program 112 through an application user interface. In the depicted embodiment, user computing device 130 includes an instance of user interface 132. In an embodiment, user computing device 130 can be a laptop computer, a tablet computer, a smart phone, a smart watch, an e-reader, smart glasses, wearable computer, or any programmable electronic device capable of communicating with various components and devices within distributed data processing environment 100, via network 105. In general, user computing device 130 represents one or more programmable electronic devices or combination of programmable electronic devices capable of executing machine readable program instructions and communicating with other computing devices (not shown) within distributed data processing environment 100 via a network, such as network 105. User computing device 130 may include internal and external hardware components, as depicted and described in further detail with respect to FIG. 3.

User interface 132 provides an interface between failure label generation program 112 on server 110 and a user of user computing device 130. In one embodiment, user interface 132 is a mobile application software. Mobile application software, or an "app," is a computer program designed to run on smart phones, tablet computers, and other mobile computing devices. In one embodiment, user interface 132 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 132 enables a user of user computing device 130 to view and/or manage output of failure label generation program 112.

Figure 2:
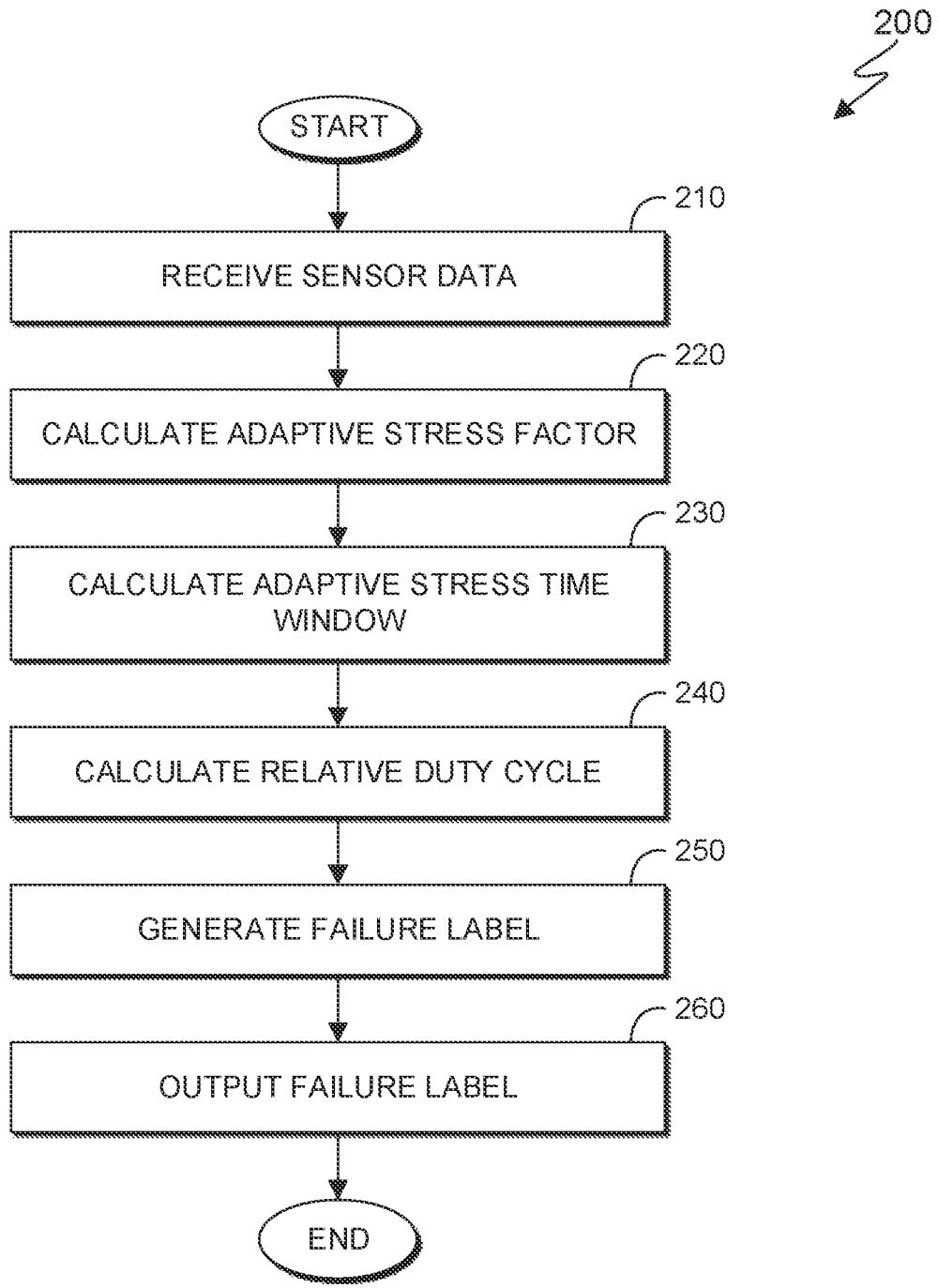
FIG. 2 is a flowchart depicting operational steps of failure label generation program, for generating failure labels in hardware time series data to enable use of artificial intelligence and machine learning for predicting hardware performance and failures, in accordance with an embodiment of the present invention.
Figure 3:
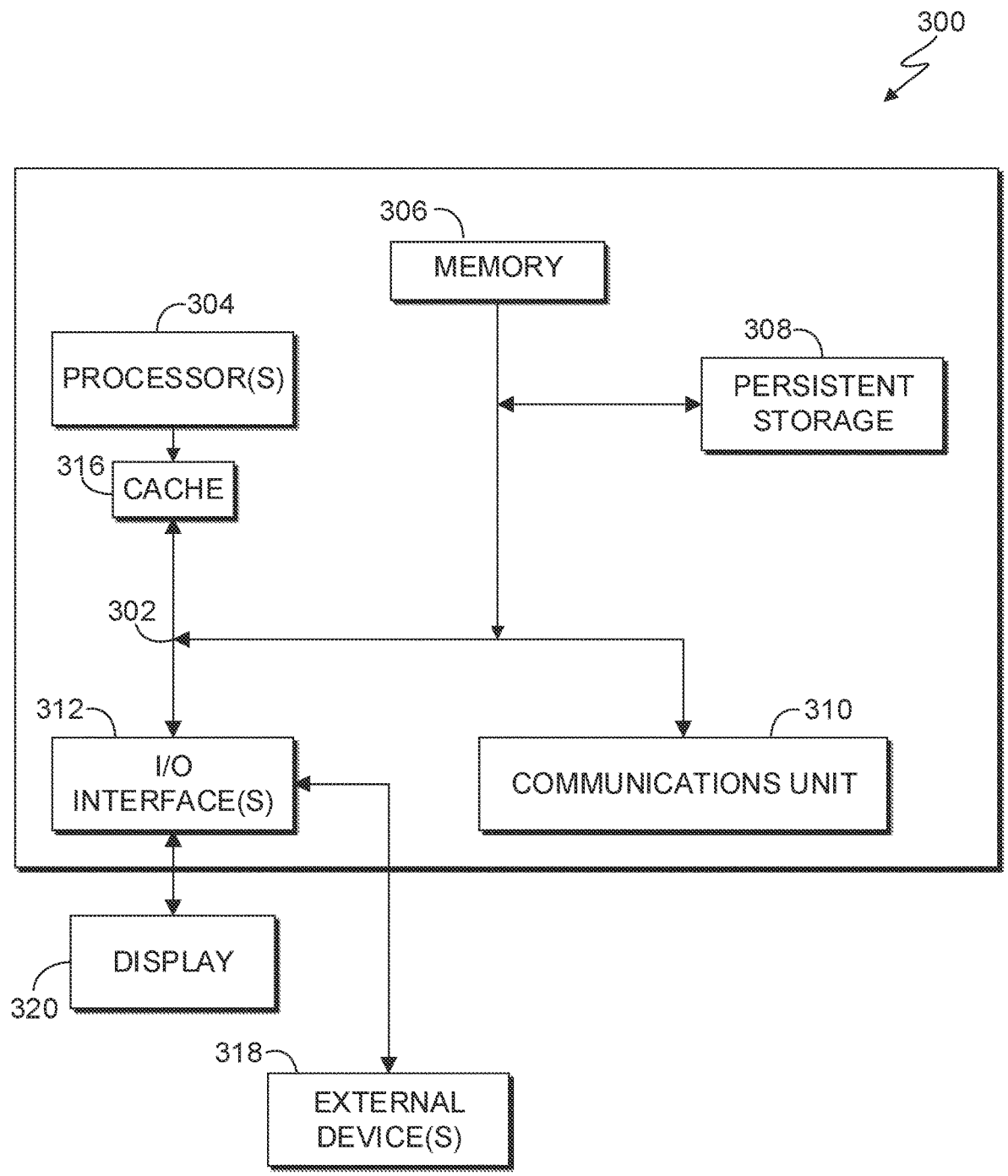
FIG. 3 depicts a block diagram of components of a computing device of the distributed data processing environment of FIG. 1, in accordance with an embodiment of the present invention.

FIG. 2 is a flowchart 200 depicting operational steps of failure label generation program 112, for generating failure labels in hardware time series data for a given hardware system to be used by Artificial Intelligence (AI) and ML models to predict a hardware system's performance and/or failures, in accordance with an embodiment of the present invention. It should be appreciated that the process depicted in FIG. 3 illustrates one possible iteration of failure label generation program 112, which can run continuously as sensor data is received from sensors of a given hardware system.

In step 210, failure label generation program 112 receives sensor data. In an embodiment, failure label generation program 112 receives sensor data in the form of hardware time series data from hardware and/or IoT sensors coupled to a given hardware system, e.g., hardware system 120. In an embodiment, failure label generation program 112 receives sensor data collected in the form of Perfmon metrices, in which Perfmon metrices refer to health parameters for the hardware system that are programmatically collected. In an embodiment, failure label generation program 112 receives hardware time series data from the hardware and/or IoT sensors continuously or at pre-set intervals. In an embodiment, failure label generation program 112 extracts system metrics, such as system states A(t), for the given hardware system from the incoming sensor data. The hardware system under consideration is characterized by a system matrix A(t) that represents system states in terms of the hardware system's eigenvalues and eigenvectors, in which the system matrix represents the hardware system's internal stability and internal behavioral states and t represents a current time.

In step 220, failure label generation program 112 calculates an adaptive stress factor. In an embodiment, failure label generation program 112 calculates an adaptive stress factor $ASF(\tau)$, which measures a behavior of the hardware system under a given type of input B(t). Types of inputs provided to the hardware system over time is defined as B(t). Types of inputs may include, but are not limited to, temperature over time, pressure, vibrations, number of user inputs/instructions, usage types (hard, soft), failure frequencies, replacement frequency, maintenance schedules, number of users, and applications types.

The adaptive stress factor ASF(t) is a dynamic selection model, e.g., neural network or an adaptive classification ML model, (hereinafter just referred to as "model") that selects a first order differential equation dx/dy or a second order differential equation $dx^2/dy^2$ if the first order differential equation dx/dy does not shows a rate of change, i.e., a first order or a second order change percentage of various parameters and/or time series metrices of the hardware system, in which r represents a predicted change in time $\Delta t$. The change percentage represents the percentage of rise (increase) or fall (decrease) of various parameters for a part. For example, temperature changes with respect to vibrations, i.e., x=vibrations and y=temperature, and dx/dy doesn't show a rate of change, but $dx^2/dy^2$ shows a change in vibrations y due to temperature x.

In an embodiment, failure label generation program 112 calculates an adaptive stress factor for a part of the system or for the whole system depending on a previous system stress profile known by the model that shows whether a system stress distribution is uniform across operational cycle or if the system stress distribution is uniform across operational cycle is local to a certain part.

In step 230, failure label generation program 112 calculates an adaptive stress time window. In an embodiment, failure label generation program 112 calculates an adaptive stress time window ASTW($\tau$) that measures a sustenance of the adaptive stress factor ASF($\tau$) over a given time, i.e., for a given system state A(t) and given input B(t), the adaptive stress time window ASTW($\tau$) measures how long a change is sustained during operation of the part or system as a whole, i.e., a spatial distribution of the adaptive stress factor ASF(x).

In step 240, failure label generation program 112 calculates a relative duty cycle. In an embodiment, failure label generation program 112 calculates a relative duty cycle RDC(t+$\tau$) that represents a number of cycles that the part or system as a whole has gone through irrespective of design limits, i.e., the relative duty cycle is how the part or system as a whole tolerated and/or behaves throughout operation cycles, which could exceed design limits. For a given system, the relative duty cycle RDC(t+$\tau$) is defined as a function of the internal state A(t) of the system, the type of input B(t), the change to a given type of input or adaptive stress factor ASF($\tau$), and how long the change is sustained or adaptive stress time window ASTW($\tau$), as shown in equation (1) below.

$$RDC(t+\tau) = [A(t) * B(t) * ASF(\tau)]^{ASTW(\tau)} \quad (1)$$

In step 250, failure label generation program 112 generates a failure label. In an embodiment, failure label generation program 112 generates a failure label for a part or for the system as a whole depending on whether the adaptive stress factor was calculated for a part or for the system as a whole. In an embodiment, failure label generation program 112 generates a failure label FL(t+$\tau$) as a function of the relative duty cycle RDC(t+$\tau$) and a design duty cycle DDC, as shown in equation (2) below.

$$FL(t+\tau) = [w(t) * RDC(t+\tau)] \sim [g(t) * DDC] \quad (2)$$

In equation (2), the tilde ~ represents a mathematical function, such as addition, subtraction, or multiplication. The design duty cycle value is a single value defined by a manufacturer that represents an expected number of cycles that the part is designed to work through without significant performance degradation. In an embodiment, failure label generation program 112 normalizes the relative duty cycle RDC(t+$\tau$) and the design duty cycle DDC using adjustable weights w(t) and g(t), respectively, to ensure an output label of zero (0), denoting no failure, or an output label of one (1), denoting a failure. The failure label calculated is an absolute difference between a normalized design duty cycle and a normalized relative duty cycle, i.e., measures the quantitative difference in expected performance and the actual performance of the hardware system under stress over a period of time.

In step 260, failure label generation program 112 outputs the failure label. In an embodiment, failure label generation program 112 outputs the failure label of either zero (0) or one (1) denoting no failure or a failure, respectively, of a part or the system as a whole. In an embodiment, failure label generation program 112 outputs the failure label to a user through user interface 132 of user computing device 130. In an embodiment, failure label generation program 112 outputs the failure label to a database, e.g., database 114, to be stored.

In some further embodiments, failure label generation program 112 generates a bias penalty factor to be applied to the function for generating a failure label in step 250. In these embodiments, failure label generation program 112 generates a bias penalty factor to be fed into the failure label generation step as an active learning feedback loop. In these embodiments, failure label generation program 112 generates a bias penalty factor based on statistical measures of real hardware failure data and simulated hardware failure data, in which failure label generation program 112 receives the real hardware failure data from a Computer Failure Data Repository (CFDR). The statistical measures of real hardware failure data include (1) a time distribution of failures and (2) a mean and standard deviation of failure frequency. The statistical measures of simulated hardware failure data also include (1) a time distribution of failures and (2) a mean and standard deviation of failure frequency.

In these embodiments, failure label generation program 112 factors in the bias penalty factor when the difference in actual failure and predicted failure increases and the simulation does not converge in. In these embodiments, failure label generation program 112 factors the bias penalty factor into a confidence bound and thus probability of failure computed at any given point of time. For example, if the bias penalty factor is higher, the weights of probability of failure are lower, and thus probability of failure is lower and newer distributions are generated in.

FIG. 3 depicts a block diagram of components of computing device 300, suitable for server 110, hardware system 120, and/or user computing device 130 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110, hardware system 120, and/or user computing device 130. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating failure labels, the computer-implemented method comprising:
   receiving, by one or more processors, sensor data from a plurality of sensors associated with a hardware system;
   calculating, by the one or more processors, an adaptive stress factor, wherein the adaptive stress factor is a dynamic selection model;
   calculating, by the one or more processors, an adaptive stress time window, wherein the adaptive stress time window is a spatial distribution of the adaptive stress factor;
   calculating, by the one or more processors, a relative duty cycle, wherein the relative duty cycle is a first function of an internal state of the hardware system, a type of input to the hardware system, the adaptive stress factor, and the adaptive stress time window; and
   generating, by the one or more processors, a failure label, wherein the failure label is calculated as a second function of the relative duty cycle and a design duty cycle.

2. The computer-implemented method of claim 1, wherein generating the failure label further comprises:
   normalizing, by the one or more processors, the relative duty cycle and the design duty cycle using adjustable weights.

3. The computer-implemented method of claim 1, wherein receiving the sensor data comprises:
   extracting, by the one or more processors, metrics of the hardware system from the sensor data, wherein the metrics include system states for the hardware system; and
   wherein the sensor data is hardware time series data as Perfmon metrices.

4. The computer-implemented method of claim 1, wherein the adaptive stress factor measures a behavior of the hardware system under a given type of input, wherein the given type of input is at least one of temperature over time, pressure, vibrations, number of user inputs, usage types, failure frequencies, replacement frequency, maintenance schedules, number of users, and applications types.

5. The computer-implemented method of claim 1, wherein the dynamic selection model selects a first order or a second order change percentage of parameters of the hardware system, wherein the change percentage represents an increase or decrease of the parameters for the hardware system.

6. The computer-implemented method of claim 1, wherein calculating the adaptive stress factor further comprises:
   calculating, by the one or more processors, the adaptive stress factor for a part of the hardware system.

7. The computer-implemented method of claim 1, wherein calculating the adaptive stress factor further comprises:
   calculating, by the one or more processors, the adaptive stress factor for the hardware system as a whole.

8. The computer-implemented method of claim 1, further comprising:
   generating, by the one or more processors, a bias penalty factor based on a first statistical measure of real hardware failure data and a second statistical measure of simulated hardware failure data; and applying, by the one or more processors, the bias penalty factor to the second function.

9. A computer program product for generating failure labels, the computer program product comprising:
one or more computer readable storage media and program instructions collectively stored on the one or more computer readable storage media, the stored program instructions comprising:
program instructions to receive sensor data from a plurality of sensors associated with a hardware system;
program instructions to calculate an adaptive stress factor, wherein the adaptive stress factor is a dynamic selection model;
program instructions to calculate an adaptive stress time window, wherein the adaptive stress time window is a spatial distribution of the adaptive stress factor;
program instructions to calculate a relative duty cycle, wherein the relative duty cycle is a first function of an internal state of the hardware system, a type of input to the hardware system, the adaptive stress factor, and the adaptive stress time window; and
program instructions to generate a failure label, wherein the failure label is calculated as a second function of the relative duty cycle and a design duty cycle.

10. The computer program product of claim 9, wherein the program instructions to generate the failure label further comprise:
program instructions to normalize the relative duty cycle and the design duty cycle using adjustable weights.

11. The computer program product of claim 9, wherein the program instructions to receive the sensor data comprise:
program instructions to extract metrics of the hardware system from the sensor data, wherein the metrics include system states for the hardware system; and
wherein the sensor data is hardware time series data as Perfmon metrices.

12. The computer program product of claim 9, wherein calculating the adaptive stress factor further comprises:
program instructions to calculate the adaptive stress factor for a part of the hardware system.

13. The computer program product of claim 9, wherein calculating the adaptive stress factor further comprises:
program instructions to calculate the adaptive stress factor for the hardware system as a whole.

14. The computer program product of claim 9, further comprising:
program instructions to generate a bias penalty factor based on a first statistical measure of real hardware failure data and a second statistical measure of simulated hardware failure data; and
program instructions to apply the bias penalty factor to the second function.

15. A computer system for generating failure labels, the computer system comprising:
one or more computer processors;
one or more computer readable storage media;
program instructions collectively stored on the one or more computer readable storage media for execution by at least one of the one or more computer processors, the stored program instructions comprising:
program instructions to receive sensor data from a plurality of sensors associated with a hardware system;
program instructions to calculate an adaptive stress factor, wherein the adaptive stress factor is a dynamic selection model;
program instructions to calculate an adaptive stress time window, wherein the adaptive stress time window is a spatial distribution of the adaptive stress factor;
program instructions to calculate a relative duty cycle, wherein the relative duty cycle is a first function of an internal state of the hardware system, a type of input to the hardware system, the adaptive stress factor, and the adaptive stress time window; and
program instructions to generate a failure label, wherein the failure label is calculated as a second function of the relative duty cycle and a design duty cycle.

16. The computer system of claim 15, wherein the program instructions to generate the failure label further comprise:
program instructions to normalize the relative duty cycle and the design duty cycle using adjustable weights.

17. The computer system of claim 15, wherein the program instructions to receive the sensor data comprise:
program instructions to extract metrics of the hardware system from the sensor data, wherein the metrics include system states for the hardware system; and
wherein the sensor data is hardware time series data as Perfmon metrices.

18. The computer system of claim 15, wherein calculating the adaptive stress factor further comprises:
program instructions to calculate the adaptive stress factor for a part of the hardware system.

19. The computer system of claim 15, wherein calculating the adaptive stress factor further comprises:
program instructions to calculate the adaptive stress factor for the hardware system as a whole.

20. The computer system of claim 15, further comprising:
program instructions to generate a bias penalty factor based on a first statistical measure of real hardware failure data and a second statistical measure of simulated hardware failure data; and
program instructions to apply the bias penalty factor to the second function.

* * * * *